United States Patent [19]
Schonberger

[11] Patent Number: 5,243,868
[45] Date of Patent: Sep. 14, 1993

[54] CONTINUOUSLY AND INFINITELY VARIABLE MECHANICAL POWER TRANSMISSION

[76] Inventor: Abram Schonberger, 4608 E. Linebaugh, Tampa, Fla. 33617

[21] Appl. No.: 995,073

[22] Filed: Dec. 22, 1992

Related U.S. Application Data

[63] Continuation-in-part of Ser. No. 697,681, May 9, 1991, abandoned.

[51] Int. Cl.$^5$ .......................................... F16H 33/02
[52] U.S. Cl. ............................................ 74/64; 74/112
[58] Field of Search .................. 74/63, 64, 112, 665 B

[56] References Cited

U.S. PATENT DOCUMENTS

| | | | |
|---|---|---|---|
| 1,992,457 | 2/1935 | Anderson, Jr. | 74/64 X |
| 2,390,341 | 12/1945 | Williams | 74/64 |
| 2,960,889 | 11/1960 | Keyser | 74/64 X |
| 4,169,391 | 10/1979 | Schonberger | 74/64 X |
| 4,608,875 | 9/1986 | Wallace | 74/64 |
| 4,742,722 | 5/1988 | Wallace | 74/64 |

FOREIGN PATENT DOCUMENTS 565162 1/1924 France .................................. 74/64

Primary Examiner—Allan D. Herrmann
Assistant Examiner—David W. Laub
Attorney, Agent, or Firm—Pettis & McDonald

[57] ABSTRACT

A continuously and infinitely variable mechanical power transmission that utilizes the principles of gyrodynamics in a torque converter and gearing arrangement as its means of achieving continuous and infinitely variable torque ratios between input and output rotary members.

18 Claims, 7 Drawing Sheets

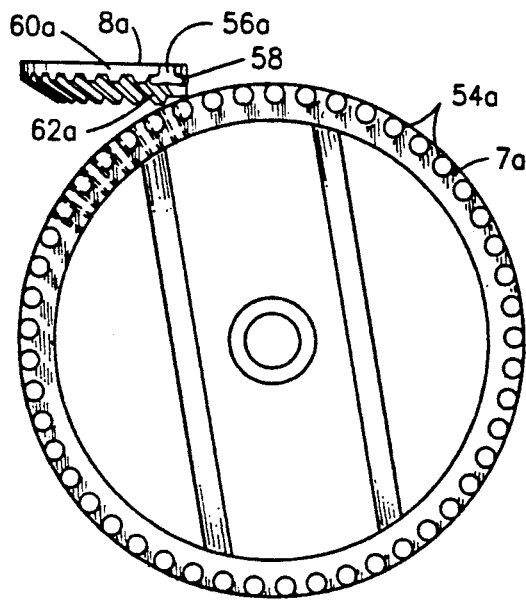
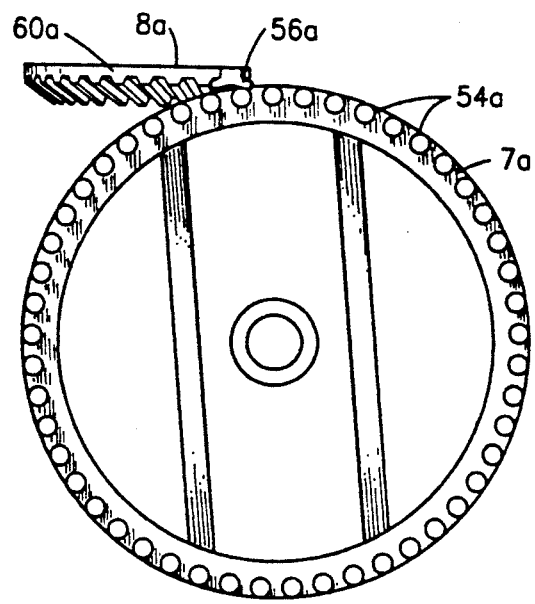
Fig. 7
Fig. 8
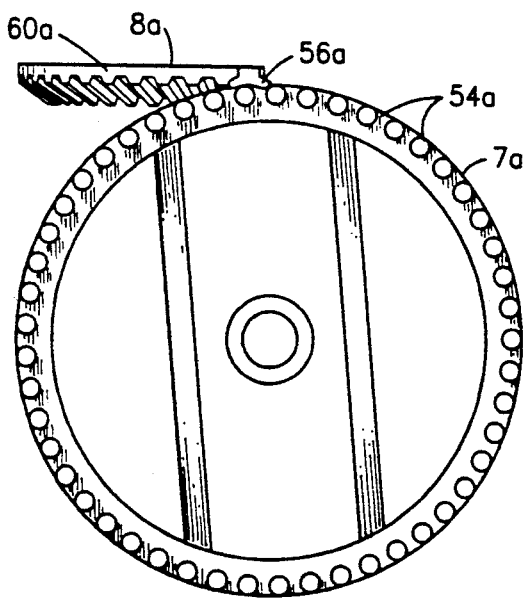
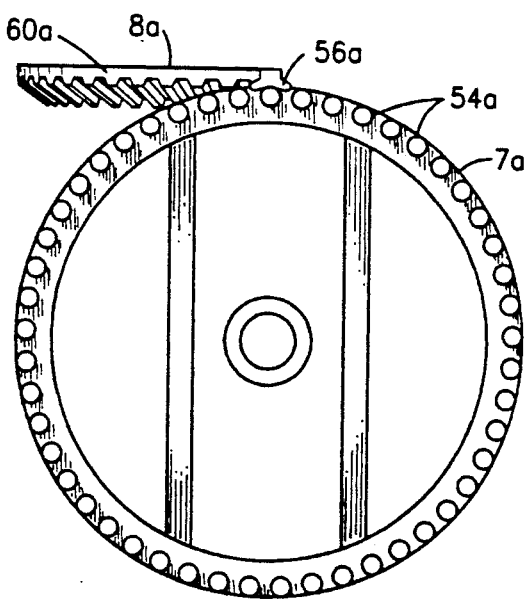
Fig. 9
Fig. 10
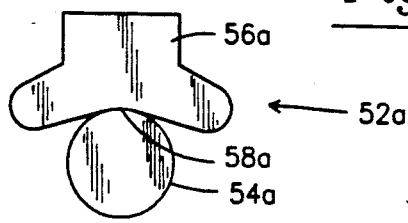
Fig. 11

CONTINUOUSLY AND INFINITELY VARIABLE MECHANICAL POWER TRANSMISSION

This is a continuation-in-part of application Ser. No. 07/697,681, filed May 9, 1991 now abandoned.

BACKGROUND OF THE INVENTION

1. Field of the Invention

The present invention relates to the design for a continuously and infinitely variable mechanical power transmission.

2. Description of the Prior Art

Devices of this type are also variously known in the art as speed changers or torque converters. In the current art, traditional principles of design employ gears, hydraulics or friction as a basic means of operation. In the current invention, the characteristics of rotors employed gyrodynamically will be shown to permit torque conversion of input-to-output over a practically infinite range. Gyrodynamic transmissions, such as that disclosed by U.S. Pat. No. 1,992,457 issued to C. J. Anderson, Jr., have not provided an even flow of output torque. Therefore, it remains clear that there is a need for a gyroscopic transmission with a smooth flow of output energy which is not limited by input or output velocities and will possess smoothness, quiet operation, durability and high efficiency. The invention may be used throughout the automotive field, including heavy-duty machinery requiring great mechanical advantages, such as lifting cranes and gas turbines that require large speed differentials.

SUMMARY OF THE INVENTION

The present invention relates to a continuously and infinitely variable mechanical power transmission that utilizes the principles of gyrodynamics as its means of achieving continuous and infinitely variable torque ratios between input and output. The gyrodynamic transmission comprises at least one torque converter that is supported by a frame. The torque converter comprises a mounting means, that is rotatably connected to the frame, for mounting a rotor for rotation about three axes, comprising a spin axis, an input precession axis and an output precession axis. The rotor and the mounting means are configured so that the spin axis of the rotor is generally perpendicular to the input precession axis and the input precession axis is generally perpendicular to the output precession axis. The rotor is spun about the spin axis by a means for rotating the rotor which is connected to the frame. One end of an input drive shaft is connected to a means for rotating the input drive shaft and the other end is rotatably connected to gearing that is rotatably attached to the mounting means. The gearing provides intermittent transmission of the rotation from the input drive shaft to the rotor so that the rotor rotates about the input precession axis. The rotation of the rotor about its own spin axis and the rotation of the rotor about the input precession axis results in an oscillating torque of at least a portion of the mounting means. The mounting means is connected to an output shaft for rotation of that shaft. A restricting means, for converting the oscillating torque of the mounting means about the output precession axis into a continuous unidirectional rotation, is interposed between the mounting means and the output shaft so that the output shaft will rotate unidirectionally in a predetermined direction.

The oscillating torque applied to the mounting means occurs when the spin axis of the rotor rotates about the input precession axis. This torque of the rotor produces the oscillating torque of the mounting means, known as precession, according to the well-known laws of the gyroscope. This precession will normally be in a plane that is at right angles to the plane of the original torque. The original torque acting through an angle does work equal to $T_o \cdot \Delta\theta$ where $T_o$ denotes original torque and $\Delta\theta$ the angle turned by that torque. The above mentioned work must go into the rotor and since the energy of the rotor about its spin axis cannot be changed by the work done by the original torque and energy losses are negligible, essentially all the work done by the original torque must go into the precession of the rotor. The work of the precession is given by $T_p \cdot \Delta\Psi$ where $T_p$ denotes the precessional torque and $\Delta\Psi$ represents the angle turned by that torque. From conservation of energy we have:

$$T_o \cdot \Delta\theta = T_p \cdot \Delta\Psi \text{ and } \frac{T_o}{T_p} = \frac{\Delta\Psi}{\Delta\theta}$$

Since in principle there is no physical restriction to the ratio $\Delta\Psi/\Delta\Lambda$, no physical limitation exists for the ratio $T_o/T_p$. It therefore follows that a transmission, properly designed, utilizing the principle of gyrodynamics should have the capability of practically unlimited torque multiplication and variability. It should be explicitly stated that the rotor during one-half of its cycle, as explained later, precesses simultaneously about two orthogonal axes. One of these axes lies along the rotor support about which the rotor precesses and becomes the power input precession axis and the other axis lies along the mounting means which lies lengthwise in the transmission and becomes the power output.

Since the two precessions are orthogonal to and independent of each other, the conditions in the proposed transmission satisfy the conditions of the general discussion as put forth earlier. Therefore, the transmission produces, by definition, torque conversion.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding the nature and objects of the invention, reference should be had to the following detailed description taken in connection with the accompanying drawings, in which:

FIG. 7 is a perspective detailed view of the gearing of the invention illustrating the re-engaging means of the gears.

FIG. 8 is a perspective detailed view of the gearing of the invention further illustrating the re-engaging means of the gears.

FIG. 9 is a perspective detailed view of the gearing of the invention further illustrating the re-engaging means of the gears.

FIG. 10 is a perspective detailed view of the gearing of the invention further illustrating the re-engaging means of the gears.

FIG. 11 is a detailed front elevational view of the curved member engaging a pintle as shown in FIG. 10.

Similar reference characters refer to similar parts throughout the several views of the drawings.

DETAILED DESCRIPTION

Figure 1:
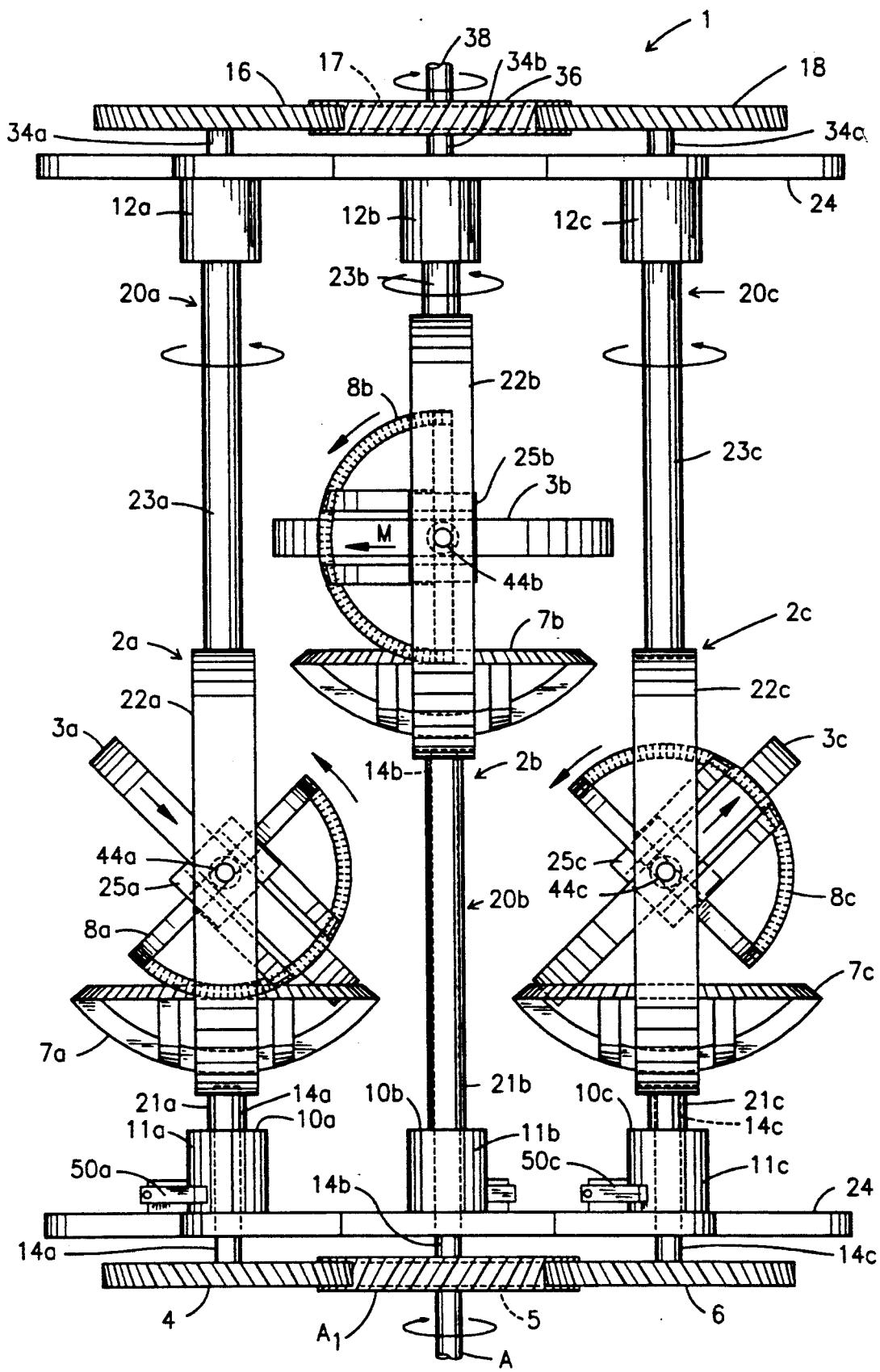
FIG. 1 is a top plan view of a preferred embodiment of the transmission of this invention.

A preferred embodiment for the transmission of this invention is illustrated in the drawings, FIGS. 1–4, 6 and 7, where the transmission is indicated generally as 1. Referring first to the view of FIG. 1 it can be seen in the preferred embodiment that three torque converters, shown generally as 2a, 2b and 2c, are mounted within a frame 24. Power is supplied to the transmission by drive shaft A and gear $A_1$, which delivers power in the form of rotary movement that is counterclockwise when viewed from the input end. Gear $A_1$ simultaneously engages gears 4, 5 and 6. Gears 4, 5 and 6 are each attached to one end of a respective input drive shaft, 14a, 14b, and 14c, causing each input drive shaft to rotate in a clockwise direction (unless noted otherwise, rotational direction will be as viewed from the power input end of the transmission 1). The other ends of the input drive shafts 14a, 14b, and 14c are each connected to their respective torque converters 2a, 2b and 2c.

Figure 3:
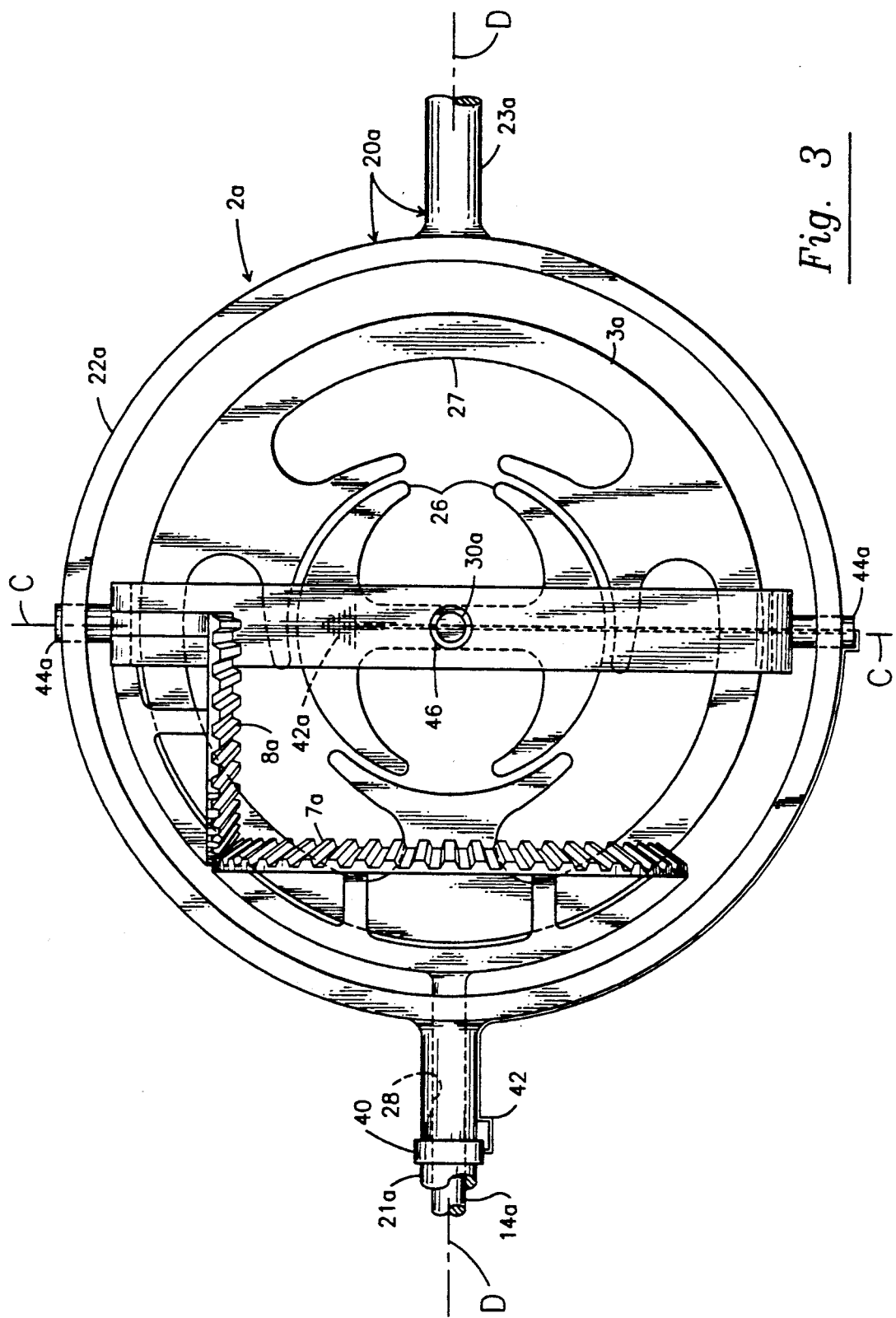
FIG. 3 is a side elevational view of the torque converter of FIG. 4, illustrating an electric motor (shown in simplified form) formed integral with the rotor.
Figure 4:
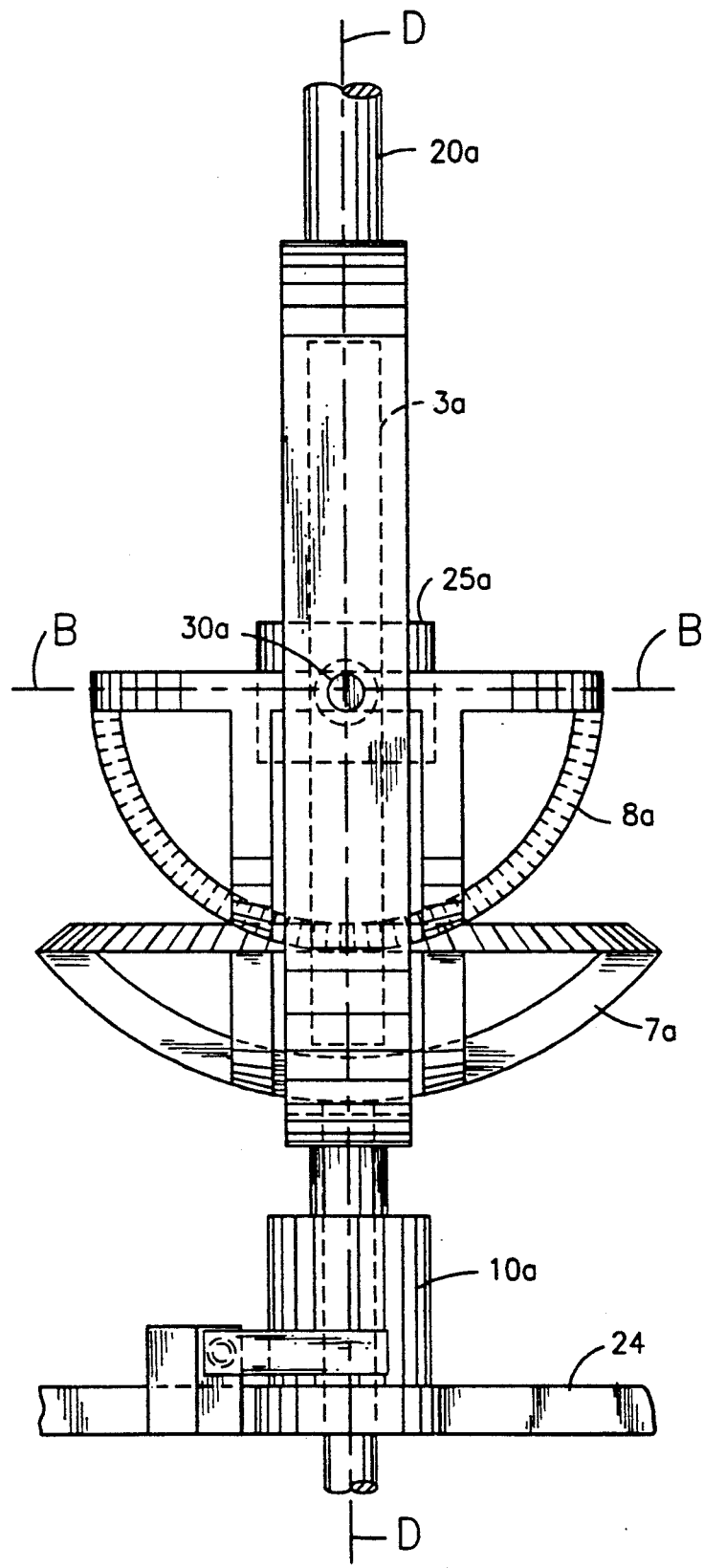
FIG. 4 is a top plan view of a single torque converter of the invention of FIG. 1.

For ease of discussion, and since each torque converter is constructed in the same manner (the only differences being the length of the input drive shafts 14, hollow support shafts 21, and solid support shafts 23 to permit a more compact arrangement), the discussion will focus on a single torque converter 2a. In a preferred embodiment of the invention, the torque converter 2a comprises a mounting means 20a, which further comprises a hollow support shaft 21a, a ring 22a, and a solid support shaft 23a. One end of the hollow support shaft 21a is journaled to the frame 24 and the other end is attached to one side of the ring 22a. One end of the solid support shaft 23a is attached to the opposing side of the ring 22a from hollow support shaft 21a, as can be seen in FIG. 3, and the other end is connected to the frame 24. While the preferred embodiment illustrates a ring 22a, this portion of the mounting means 20a may be of any suitable shape as long as the mounting means 20a remains balanced about its longitudinal axis for smooth rotation. As shown in FIG. 3, the bore 28 of the hollow support shaft 21a extends through the ring 22a, and is sized and configured to receive the input drive shaft 14a. The mounting means 20a further comprises a double wishbone support 25a which has bearing stubs 44a extending from each end. These bearing stubs 44a are rotatably mounted within the ring 22a so that the double wishbone support 25a is rotatable.

Figure 6:
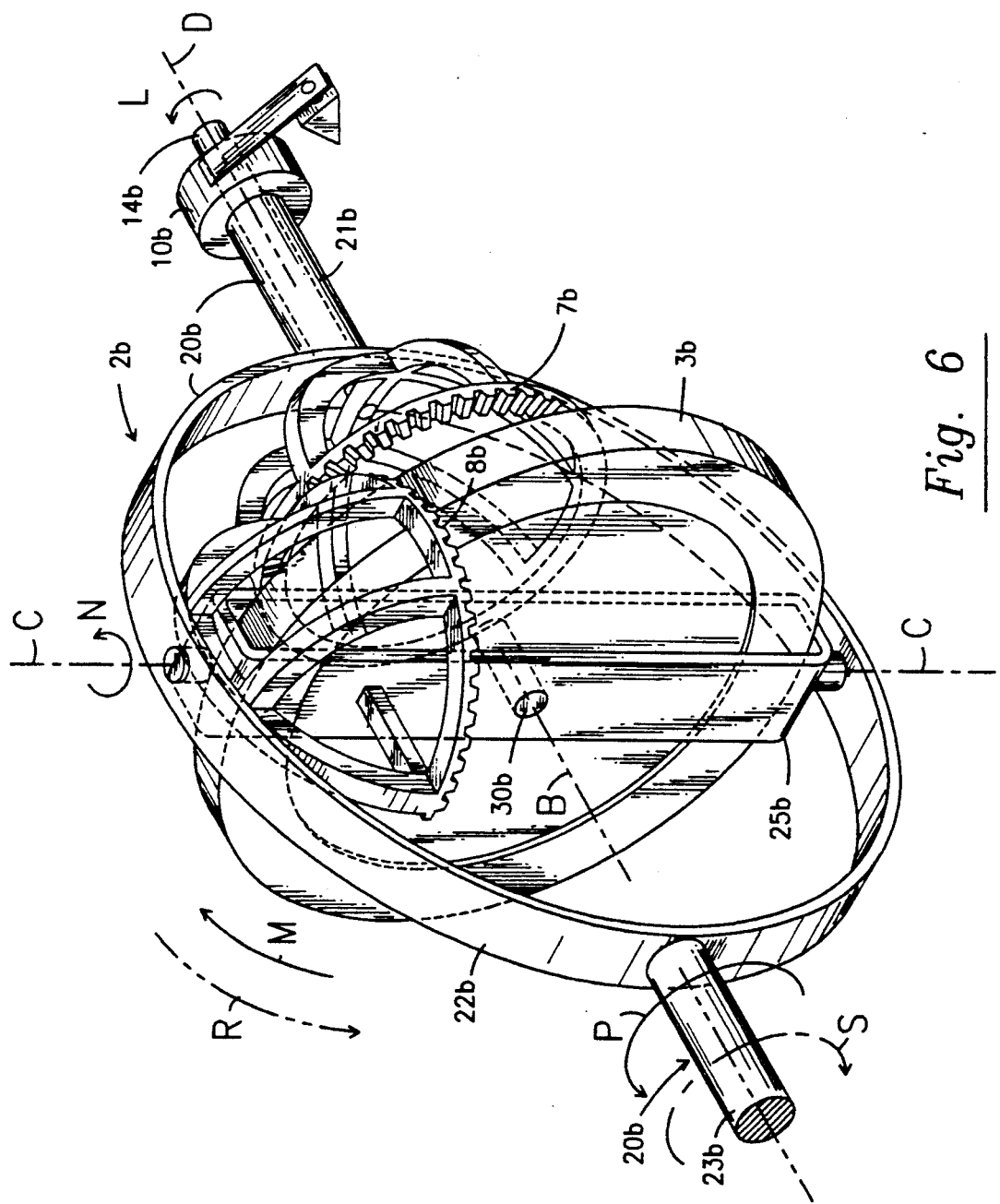
FIG. 6 is a perspective view of the center torque converter of FIG. 1 as viewed from the output end.

As best seen in FIG. 6, a rotor 3b is mounted within the double wishbone support 25b so that it may rotate about three axes, comprising a spin axis B, an input precession axis C and an output precession axis D. The rotor 3a has an axle 30a (FIG. 3) which is mounted within the double wishbone support 25a such that the axle 30a lies along the spin axis B which lies in the same plane as the input precession axis C. The input precession axis C, in the preferred embodiment, is generally normal to the output precession axis D. A means for rotating the rotor 3a is shown in FIG. 3 as an electric motor comprising a stator 26, armature 27 and brush and commutator 46. For simplicity the windings are not shown; however, such electric motors are well known in the art. Electricity is provided to the motor by an electric wire 42 and a slip ring 40.

Gearing, conveniently first gear 7a and second gear 8a is rotatably mounted within the ring 22a. The input drive shaft 14a is rotatably received by the hollow support shaft 21a so that one end of the input drive shaft 14a is attached to gear 4 and the other end is attached to gear 7a. Gear 8a in the preferred embodiment is a half gear that is attached to the double wishbone support 25a such that the gear's axis is coincident with the input precession axis C. In other embodiments, gear 8 may be a full gear. In the embodiment shown, the gears have a 1:1 ratio; however, various ratios may be satisfactorily used. The first gear 7a and second gear 8a rotate generally normal to one another, particularly since the axis of gear 7a is coincident with the output precession axis D, which as previously mentioned lies in the same plane as, and is normal to, the input precession axis C. The rotation of second gear 8a about the precession axis C causes the double wishbone support 25a and the rotor 3a mounted therein to rotate about the input precession axis C.

As shown in FIG. 1, while one end of the solid support shaft 23a is attached to the ring 22a, the other end is connected to the frame 24 and the output shaft 34a. Interposed between the solid support shaft 20a and the output shaft 34a is a restricting means, conveniently clutch 12a which may be a sprague clutch or its equivalent, that permits only unidirectional rotation of the output shaft 34a in a preselected direction. In FIG. 1 the predetermined direction of rotation for the output shaft 34a is clockwise. To each output shaft 34a, 34b and 34c are attached gears 16, 17 and 18, respectively. Gears 16, 17 and 18 each simultaneously engage drive shaft gear 36, which is attached to the drive shaft 38 for rotation of the drive shaft 38 in the counterclockwise direction.

Figure 2:
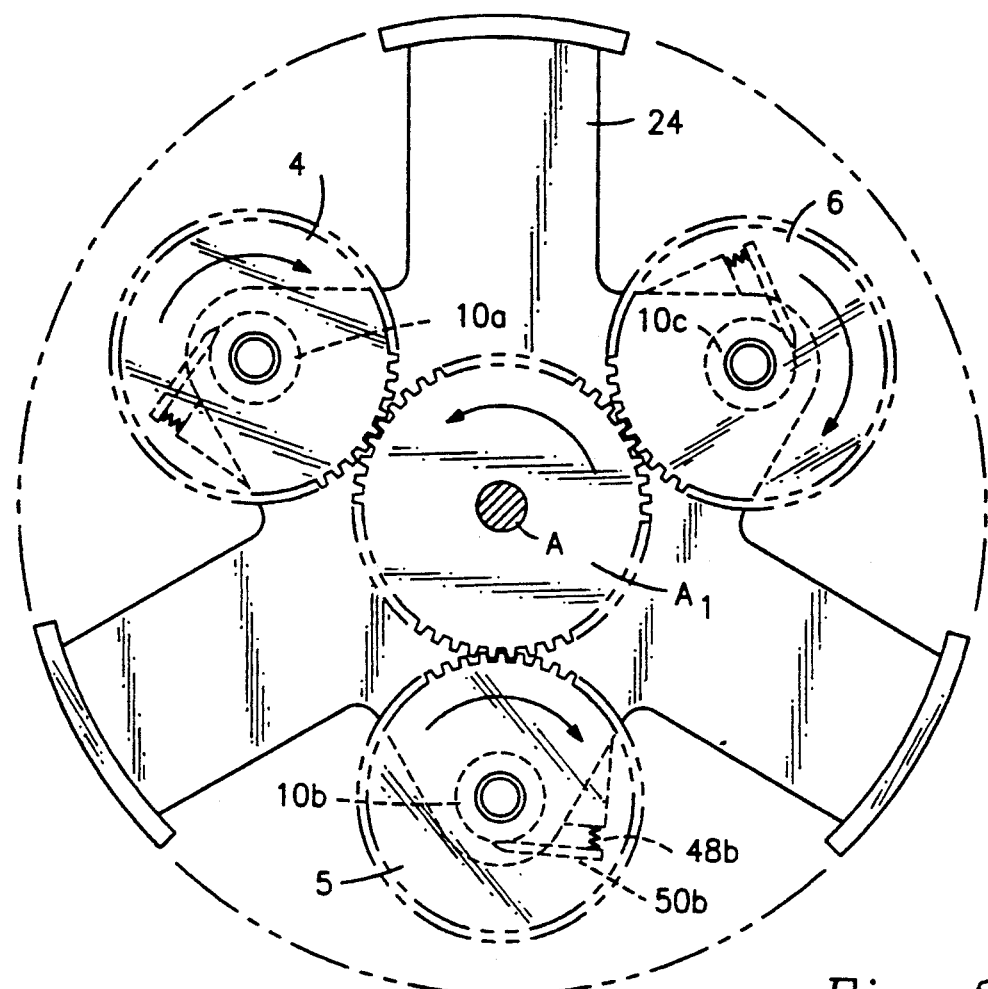
FIG. 2 is a front elevational view of the transmission of FIG. 1.
Figure 2A:
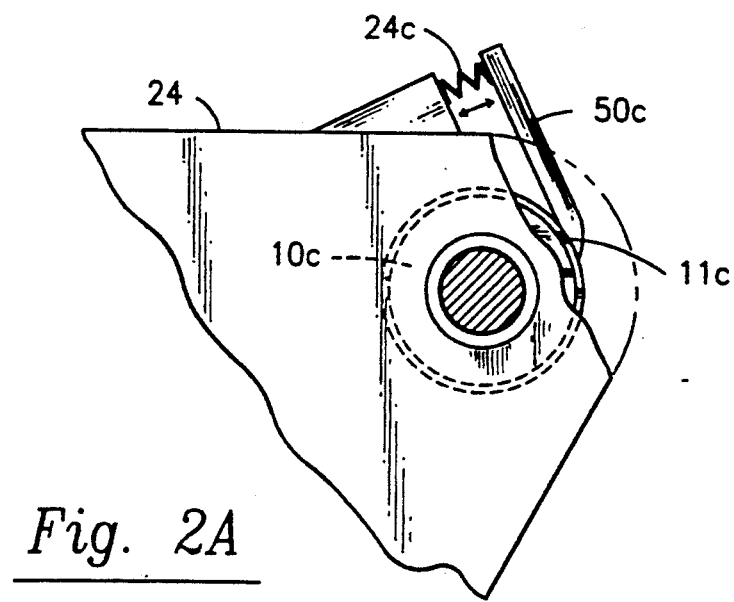
FIG. 2A is an enlarged detailed view of a portion of FIG. 2 broken out from FIG. 2 to illustrate the means for storing rotational energy (clutch and biasing means).

For illustrative purposes, as shown in FIGS. 1, 2 and 2A, the third torque converter 2C will be used to discuss the means for storing rotational energy, conveniently second clutch 10c, a biasing means, conveniently spring 48c, and arm 50c. Clutch 10c is operatively attached to the hollow support shaft 21c and is connected to spring 48c by arm 50c, as shown in FIG. 2A. The spring 48c is attached to the frame 24 adjacent the second clutch 10c. Precession, to be discussed later, creates oscillating torque within the mounting means 20c. As unidirectional rotation is desired, the second clutch 10c permits free rotation of the mounting means in a clockwise direction; however, when the mounting means 20c begins to oscillate, or rotate in the counterclockwise direction, the outer collar 11c is engaged so that the arm 50c rotates against the spring 48 storing rotational energy therein. As the torque of the counterclockwise rotation decreases, the spring 48c of FIG. 2A inputs a clockwise rotation to the mounting means 20c overcoming existing inertial forces.

Figure 5:
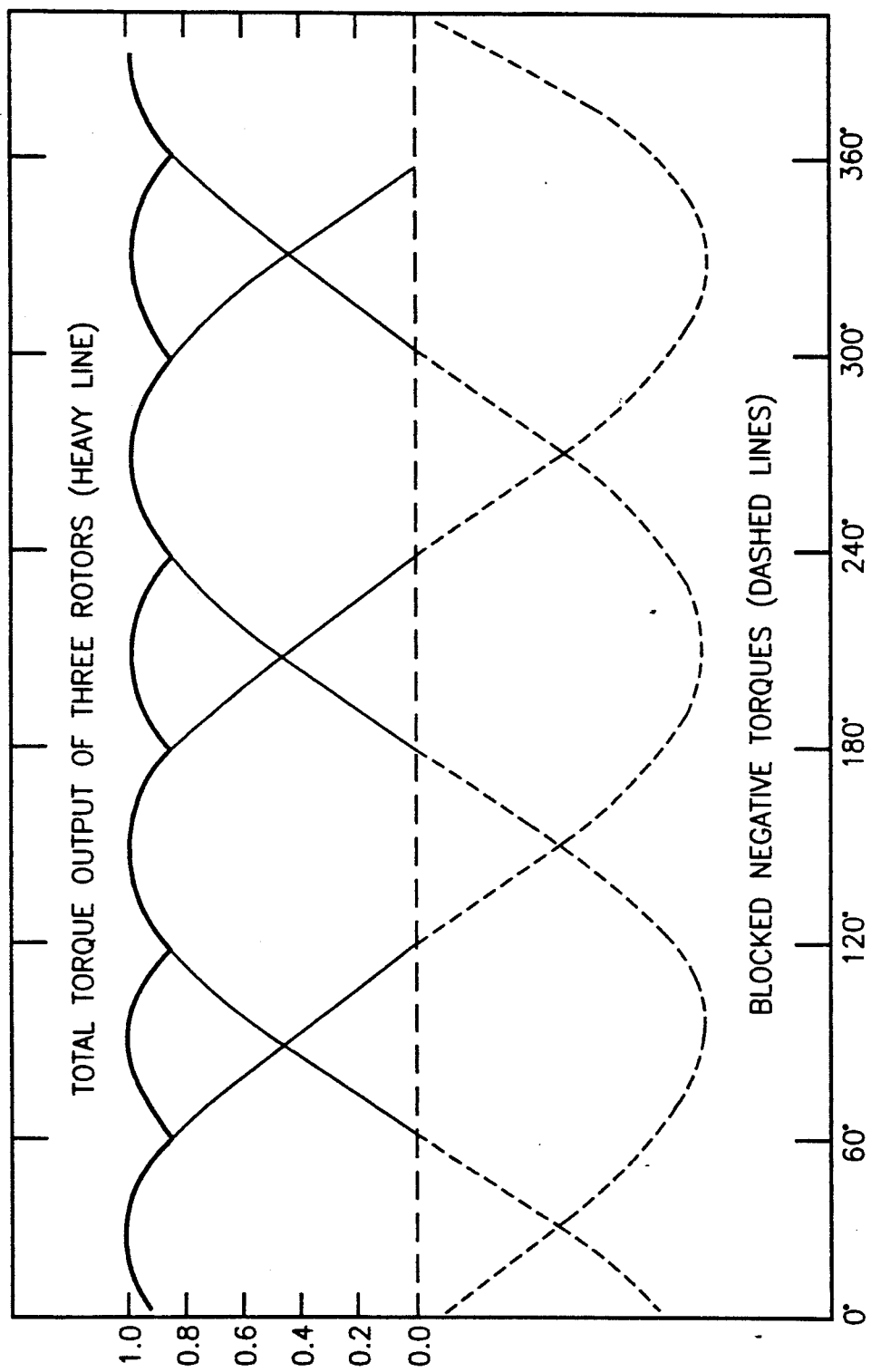
FIG. 5 is a graph illustrating the total torque output resulting from the torque of the three rotors of the invention of FIG. 1.

In the preferred embodiment, three torque converters 2a, 2b and 2c are illustrated. A single torque converter may be used; however, a single torque converter will create much greater surging in the rotation of the drive shaft 38 and the input shaft A than when three torque converters are used. Each rotor 3a, 3b and 3c rotates through 360 degrees about the input precession axis C of their respective torque converters. After establishing the same zero degree position of rotation for each rotor, in relation to the transmission 1, each rotor is then disposed at equal intervals about the 360 degrees of rotation. In the case of three rotors, the spacing is 120 degrees. This spacing permits the transmission of the maximum precession energy (to be discussed more completely) by each torque converter to occur at equally spaced intervals of time as shown in FIG. 5.

Second gear 8a, 8b and 8c, being half gears, means that they maintain engagement with their respective first gear 7a, 7b or 7c, during 180 degrees of rotation and rotate freely during 180 degrees of rotation. Due to the low losses of energy during the free rotation, the second gears 8a, 8b and 8c will re-engage with their respective first gears 7a, 7b and 7c at the same speed each time so that the rotors maintain their equally-spaced intervals. However, since aberrations may occur during operation, a catch system 52a, shown in FIGS. 7-11, ensures that the teeth of gears 7a and 8a reengage at the end of each free rotation without clashing. The catch system 52a, comprises a plurality of pintles 54a that extend outwardly from the back side, the side opposing the gear teeth, of first gear 7a. A curved member 56a having a concave portion 58a is attached to the peripheral edge 60a of the second gear 8a so that the concave portion 58a of the member 56a engages one pintle 54a as the leading edge 62a, shown in FIG. 7, of the second gear 8a rotates adjacent the first gear 7a. If gear 8a approaches late, as seen in FIG. 8, or early, FIG. 9, the curved member 56a will advance or retard respectively the rotation of gear 8a so that the pintle is captured by the center point of the curved portion 58a as shown in FIGS. 10 and 11. The capture of one pintle 54a ensures that the teeth of the half gear, second gear 8a, engage the teeth of first gear 7a without clashing.

The transmission 1, in the preferred embodiment, is constructed of steel, however, any material may be used for individual portions of the transmission 1 that is suitable for the purpose intended, particularly to meet the stresses expected to be applied as well as the wear and tear from that particular mode of usage. Electrical motor parts, bearings and so forth are all constructed from typical materials well known in the industry.

Having thus set forth a preferred construction for the transmission 1 of this invention, it is to be remembered that this is but a preferred embodiment. Attention is now invited to a description of the operation of the transmission 1. As can be seen in FIG. 2, power is delivered to the transmission 1 by the power input shaft A and the attached power input gear $A_1$. Gear $A_1$ transmits simultaneously the rotational energy to input gears 4, 5 and 6 which drive first gears 7a, 7b and 7c as seen in FIG. 1. We will again discuss the operation of a single torque converter (in this case torque converter 2b), for simplicity. Each torque converter will operate in the same manner with the only significant difference being that the rotors of each torque converter at any particularly point in time will be located at a different position of their 360 degree rotation in relation to the other rotors. The rotors being equally spaced apart (120 degrees) as discussed previously. Comparing FIG. 6 with torque converter 2b of FIG. 1 it will be seen that FIG. 6 is a perspective view of torque converter 2b as viewed from the output end of the transmission 1. In the representation of the invention as shown in FIG. 1, the only significant differences between each torque converter is the position of rotation of the double wishbone supports 25 and the rotational direction of the rotors 3 in relation to the transmission 1. In FIG. 6 the spin axis B is coincident with the output precession axis D so that the rotor is normal to the axis D and is rotating in the direction M, defining the zero degree position of the rotor. The rotor 3b is rotated about its spin axis B unidirectionally within the wishbone support 25b; however, as the wishbone support 25b rotates within the ring 22b the direction of rotation of the rotor in relation to the output precession axis D changes. After the wishbone support 25b has rotated 180 degrees from the zero degree position defined by FIG. 6, the direction of rotation of the rotor will now be R (as seen in phantom and in relation to axis D) opposite to the direction of rotation M in the zero degree position. The rotor, of course, is still rotating unidirectionally in relation to the wishbone support 25b. Beginning in the zero degree position and rotating the wishbone support 180 degrees, with the rotor 3b rotating in the direction M, the input drive shaft 14b rotating in the direction L driving the wishbone support 25b in the direction N through gears 7b and 8b, a rotational force is created about the output precession axis D causing the mounting means 20b to rotate in the direction P in accordance with the gyroscopic laws. This rotation P is typically identified as "output precession". When the wishbone support 25b is in the zero degree position as shown in FIG. 6, the output precessional force is actually zero, and therefore no precessional rotation P would take place. As the wishbone support 25b rotates from the zero degree position to the 90 degree position the output precessional force increases from zero to its maximum in the P direction. At the 90 degree position the rotor axle 30b will be at right angles to the output precessional axis D. From the 90 degree to the 180 degree position the output precessional force will go from its maximum to zero in the direction P. After the wishbone support 25b has rotated 180 degrees it will appear generally as shown in FIG. 6, except that the rotor will now be rotating in the direction R, shown in phantom. As the wishbone support 25b rotates between 180 degrees and 360 degrees, the output precessional torque will now cause the mounting means 20b to attempt to rotate in the opposite direction S, shown in phantom. The peak torque of the mounting means 20b in the direction S will occur at the 270 degree position. As can be seen by the previous description, the rotational torque of the mounting means 20b is oscillatory. It is thus seen that the output torque on the mounting means 20b will vary from a maximum in one direction when axis B is perpendicular to axis D down to zero when axis B is coincident with axis D then up to a maximum in the opposite direction when axis B is again perpendicular to axis D then down to zero during a single revolution of the wishbone support 25b, which results in a sinusoidal output curve as shown in FIG. 5.

Since a predetermined unidirectional rotation of the output shaft 38 is necessary for the proper operation of the transmission 1, the rotation of the mounting means 20b in the S direction is prevented from being passed to the output shaft 34b by the first clutch 12b. The first clutch 12b permits the output shaft 34b to rotate only in the P direction even when the mounting means 20b moves in the S direction a small amount. The second clutch 10b and its related collar 11b, arm 50b and spring 48b, as seen in FIG. 2, provide a means for storing the precessional torque occurring in the S direction as the wishbone support 25b rotates from the 180 degree position to the 360 degree or zero degree position. The rotational torque in the S direction is transmitted by the arm 50b to the spring 48b as the mounting means 20b rotates in the S direction. The torque reaches a maximum at the 270 degree position and goes toward zero as the wishbone support 25b approaches the 360 degree position. As the precessional torque lessens in the S direction, the torque applied by the spring 48b and the arm 50b begins to move the mounting means 20b in the P direction even before the wishbone support 25b reaches the 360 degree position.

As shown by FIGS. 1 and 2, the three torque converters 3a, 3b and 3c work together to create as smooth a flow of torque to the output shaft 38 as possible. With the positioning of the wishbone supports 25a, 25b and 25c and the respective rotors 3a, 3b and 3c, at 120 degree intervals, each torque converter will reach its maximum output of rotation in the P direction once during one cycle of the transmission (360 degrees of rotation of the wishbone supports 25) as shown by the chart in FIG. 5. Since the rotation in the S direction is blocked by the first clutch 11 and only the rotation in the P direction is passed to the output shaft 38, the combined torque will equal the darkened line shown in FIG. 5.

The following is submitted as verification of the torsional stability and output torque characteristics of the transmission 1. Referring to FIG. 1 with rotors 3a, 3b and 3c separated by 120 degrees of angular displacement with respect to each other, total torque in a transverse plane (plane at right angle to the plane containing the axis of the mounting means 20a, 20b and 20c) is:

$$T_t = K\{\sin\theta + \sin(\theta + 120°) + \sin(\theta + 240°)\} \quad (1)$$

where $T_t$ equals total transverse torque, K equals $I\Omega\omega$, where I is moment of inertia of each rotor, $\omega$ is angular velocity of each rotor about its respective spin axis (same for each rotor), $\Omega$ is angular velocity of each rotor about its respective input precession axis (same for each rotor) and $\theta$ is instantaneous angular location or component of angular location relative to the respective input precession axis of each rotor. Remembering that zero degrees is at the point of first gear 7 and second gear 8 engaging one another, the following is a continuation from Equation (1):

$$\sin(\theta+120°) = \sin\theta\cos120° + \cos\theta\sin120°$$

$$\sin120° = \sin60° = \frac{\sqrt{3}}{2}$$

$$\cos120° = -\cos60° = -\tfrac{1}{2}$$

$$\sin240° = -\sin60° = -\frac{\sqrt{3}}{2}$$

$$\cos240° = -\cos60° = -\tfrac{1}{2}$$

Therefore, from Equation (1) we have:

$$K\left\{\sin\theta + \sin\theta\cdot\left(-\tfrac{1}{2}\right) + \cos\theta\cdot\tfrac{\sqrt{3}}{2} + \sin\theta\cdot\left(-\tfrac{1}{2}\right) + \cos\theta\cdot\left(-\tfrac{\sqrt{3}}{2}\right)\right\} =$$

$$K\left\{\tfrac{1}{2}\sin\theta - \tfrac{1}{2}\sin\theta\right\} = 0$$

This shows that the transmission 1 is torsionally stable longitudinally and since the same proof is valid for the transverse torque this shows, the transmission 1 is torsionally stable (no internal vibratory torques). $T_o$ is the clockwise, considered positive, component of the total transverse torque ($T_t$). This reduces to:

$$T_o = K\{\sin\theta + \sin(120° - \beta)\} =$$

$$K\left\{\sin\theta + \tfrac{\sqrt{3}}{2}\cos\theta + \left(-\tfrac{1}{2}\right)\sin\theta\right\}$$

Differentiating and testing for maximum value of $T_o$ in the domain of $\theta = 0°$ to $60°$ we have:

$$\frac{dT_o}{d\theta} = K\left\{\cos\theta + \tfrac{\sqrt{3}}{2}(-\sin\theta) + \left(-\tfrac{1}{2}\right)\cos\theta\right\}$$

$$\frac{dT_o}{d\theta} = K\left\{\cos\theta - \tfrac{\sqrt{3}}{2}\sin\theta - \tfrac{1}{2}\cos\theta\right\}$$

when $dT_o/d\theta = 0$ $$K\left\{\cos\theta - \tfrac{\sqrt{3}}{2}\sin\theta - \tfrac{1}{2}\cos\theta\right\} = 0$$

$$\cos\theta = \sqrt{3}\,\sin\theta$$

$$\cos^2\theta = 3(1 - \cos^2\theta) \text{ and}$$
$$\cos^2\theta = 3 - 3\cos^2\theta\,; \; 4\cos^2\theta = 3$$

$T_o$ = max when $\cos\theta = \frac{\sqrt{3}}{2}$ and
therefore $\theta = 30°$
From $\theta = 30°$ to $\theta = 60°$ $$\frac{dT_o}{d\theta} = K\left\{\tfrac{1}{2}\cos\theta - \tfrac{\sqrt{2}}{2}\sin\theta\right\}$$

is negative and $\theta = 60°$ $T_o$ becomes $K\{\sin\theta\}$ because of the physical design of the transmission which disconnects all negative torques from the output torque ($T_o$) and $K\sin\{120° + \theta\}$ becomes negative beyond $\theta = 60°$. From $\theta = 60°$ to $\theta = 120°$ we have $$\frac{dT_o}{d\theta} = K\{\cos\theta\} = 0 \text{ at } \cos\theta = 0° \text{ and } \theta = 90°$$

At $\theta = 120°$ the cycle repeats, consequently there is no need to pursue analysis beyond this point. From $\theta = 90°$ to 120°, cos θ is negative, giving a minimum at θ = 120°. Hence, a maximum or minimum of $T_o$ occurs every 30°, fluctuating from $$K\left(0 + \frac{\sqrt{3}}{2} - 0\right) = K\left(\frac{\sqrt{3}}{2}\right),$$

a minimum at θ = 0°, and $$K\left(\frac{1}{2} + \frac{3}{4} - \frac{1}{4}\right) = K\{1\},$$

a maximum at θ = 30°, and $$K\left(\frac{\sqrt{3}}{2} + \frac{\sqrt{3}}{2} \cdot \frac{1}{2} - \frac{1}{2} \cdot \frac{\sqrt{3}}{2}\right) = K\left(\frac{\sqrt{3}}{2}\right)$$

a minimum at θ = 60°, and
$K\{\sin\theta\} = K\{1\}$
a maximum at θ = 90°

Fluctuations of $T_o$ are therefore:

$$K\left(1 - \frac{\sqrt{3}}{2}\right) = K\{1 - .866\} = K\{0.134\}$$

This is a maximum torque fluctuation which occurs only at stall. As will be shown, all output torque fluctuations in operational situations are lower than the maximum value, as the following analysis shows.

Referring to FIG. 1, we see that second gears 8a, 8b and 8c rotate about their respective driving gear, gears 7a, 7b and 7c, in the direction that first gears 7a, 7b and 7c are turning, as they are being driven by their respective first gears. Therefore, except at stall conditions, i.e., when the drive shaft 38 is stationary with input shaft A turning, the angular velocity of the rotors about the input precession axis C will be different from the angular velocity of the input shaft A not only because of any gear ratio difference existing between the first and second gears, but also because of the rotation of the second gears about the first gears. This fundamental fact creates a dual path for the input power through the transmission 1; part of the power goes through the input drive shafts 14 located within the hollow support shafts 21 to rotate the rotors 3 and wishbone supports 25 about the input precession axis C, and the remainder through the same internal structure, input drive shafts 14, first and second gear directly to the output gears 16, 17 and 18 via mounting means 20, and then to output shaft 38. Since the same gears 7 and 8 drive both the input through the rotors and the input directly to the output shaft 38, as shown earlier, the same input torque value must be supplied to both power pads and further the relationship of the power supplied through the rotors 3 and wishbone supports 25 and total power supplied by the input shaft is (R−1)/R where R is the ratio of torque conversion through the transmission. Concerning the output torque of the transmission, we see that the ratio of the output torque contributed by the precession of the rotor to the total output torque must also be the same as the above mentioned expression for the input (R−1)/R because both precessional torque and the total torque have the same angular velocity and only such torque ratios can satisfy the conservation of energy requirements. As a consequence of the foregoing, the output torque fluctuation, mentioned earlier, expressed in general terms is $$\frac{R-1}{R} \times K(0.134).$$

As an example, let R = 5. Then for a torque conversion of 5 through the transmission the output torque fluctuation is $$\frac{5-1}{5} \cdot K(0.134) = \frac{4}{5} \cdot K(0.134) = K(0.107).$$

Therefore, at torque conversion of 5:1 through the transmission the output torque fluctuation is K to K(0.893). As stated earlier, lower torque conversion values yield even smaller fluctuations and approach zero as the torque conversion through the transmission approaches a value of 1:1.

As stated earlier, the ratio of torque conversion is controlled by varying the angular velocity of the rotors about their respective spin axes B. The following verification is submitted.

It is necessary to investigate only the case where the input torque from the power source maintains a constant value because all other situations will be variations of the constant input torque condition and proof of one situation is valid for all variations thereof.

The resistance torque which the transmission presents to the input torque of the power source is:

Torque = $I\omega\Psi$, where I is the moment of inertia of the rotor, ω is the angular velocity of the rotor about its spin axis, and Ψ is the angular velocity of the rotor precession. Returning to the term "Ψ", we must remember that this precessional term represents the angular velocity of the transmission drive shaft 38. With the input torque at its constant maximum, as stipulated, power input to the transmission can be varied only by varying the angular velocity of the input power torque. But the angular velocity of the input torque is held in check by the fact that any power increase at the input side is, of course, accompanied by a corresponding increase of output power (minus frictional losses), which means, where output load remains constant, which would be the case normally, the angular velocity of the drive shaft must increase if the angular velocity of the input torque increases. Therefore, if Ψ increases, the torque presented by the transmission to the input torque increases (see last equation). Consequently, this balance of torques in steady state, act as an automatic cruise control.

We now examine the means of changing the torque conversion through the transmission by varying the angular spin of the rotors 3a, 3b and 3c about their respective spin axes B. Varying the voltage to the rotors by means of a rheostat controls the rotors' angular spin velocity. Decreasing the angular velocity of the rotors about their spin axes gives a decrease in the transmission torque opposing the input torque of the power source because the transmission input torque is T = IωΨ, symbols already defined. The above equation shows that decreasing the angular velocity of the rotor about its spin axis will decrease the transmission torque opposing the input power source. The angular velocity of the input power source will now increase, putting more power into the input side of the transmission and to the output side of the transmission, thence to the load and accelerating the load because of the increased power put into the input side of the transmission, as mentioned earlier. Remembering that the torque of the input power source remains essentially constant, as stipulated earlier, equilibrium at the input side of the transmission for a new steady state can be accomplished only by an increased value of $\Psi$ which was occasioned by the acceleration just mentioned. After the acceleration of the load is completed, less output power is required to maintain the load at a constant speed and since $\Psi$ is now greater than before the acceleration, $\omega$ must be decreased proportionately and the angular velocity of the input power torque must decrease to its original value (before acceleration of the output load), because the resistance torque conditions at the input side of the transmission are identical to those prior to the acceleration. Since the angular velocity of the input has returned to its original value, but $\Psi$, the angular velocity of the output, has increased, by definition we must have a change in torque conversion if conservation of energy is to be satisfied. The increased value of $\Psi$ is of course obtained at the expense of decreased output torque. Increasing torque conversion through the transmission means decreased values of $\Psi$, hence $\omega$ must be increased proportionately to maintain constant input torque while maintaining the same input torque velocity.

It will thus be seen that the objects set forth above, among those made apparent from the preceding description, are efficiently attained and, since certain changes may be made in the above article without departing from the scope of the invention, it is intended that all matter contained in the above description are shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A continuously variable transmission comprising:
   an input drive shaft having a first end and a second end;
   a means for rotating said input drive shaft connected to said first end of said input drive shaft;
   a frame;
   at least one torque converter supported by said frame, said torque converter comprising,
     a rotor;
     a mounting means rotatably connected to said frame for mounting said rotor for rotation about three axes, comprising a spin axis, an input precession axis and an output precession axis, such that said spin axis is generally perpendicular to said input precession axis and said input precession axis is generally perpendicular to said output precession axis;
     a means for rotating said rotor about said spin axis;
     gearing rotatably connected to said second end of said input drive shaft and rotatably attached to said mounting means, said gearing providing intermittent transmission of rotation from said input drive shaft to said rotor such that said rotor rotates about said input precession axis;
   an output shaft connected to said mounting means; and
   a restricting means for converting the resulting alternating rotation of at least a portion of said mounting means and said rotor about the output precession axis into a continuous unidirectional rotation of said output shaft, said restricting means being mounted to said frame and interposed between said mounting means and said output shaft, whereby said output shaft will rotate in a predetermined direction.

2. A transmission as in claim 1 further comprising a plurality of torque converters, said input drive shaft being connected to said gearing of each said torque converter and said output shaft being connected to each said mounting means.

3. A transmission as in claim 2 wherein each said rotor continuously rotates from 0 degrees through 360 degrees about said input precession axis of a respective said torque converter, said 0 degree position of each said rotor about said precession axis in relation to said transmission being the same, each said rotor being disposed and maintained at generally equal intervals about said 360 degrees of rotation about each respective said input precession axis.

4. A transmission as in claim 1 wherein said transmission comprises three of said torque converters connected to said frame, said input shaft being connected to said gearing of each said torque converter and said output shaft being connected to each said mounting means of each said torque converter.

5. A transmission as in claim 1 wherein said mounting means comprises:
   a support member connected to said frame;
   a double wishbone support having two ends, each end comprising a shaft nub, each nub being rotatably attached to said support member such that the axis of said wishbone support is coincident to said input precession axis;
   a rotor spin axle mounted to said double wishbone support such that said spin axis lies in the same plane as said output precession axis, said rotor being mounted on said spin axle; and
   wherein said gearing comprises a first gear attached normal to said second end of said input drive shaft and a second gear attached to said double wishbone support such that the axis of said second gear is coincident with said input precession axis, said second gear being a half gear intermittently engaging said first gear, whereby as said half gear rotates, said rotation of said input drive shaft is intermittently transmitted to said rotor causing said rotor to rotate about said input precession axis.

6. A transmission as in claim 5 wherein said first and second gears each have teeth, a back side generally opposing said teeth and a peripheral edge, said first gear further comprising a plurality of pintles extending outwardly from said back side adjacent said peripheral edge of said first gear, said second gear further comprising a leading edge and a curved member attached to said peripheral edge of said second gear, said member having a concave portion, said member being aligned and configured such that said concave portion of said member captures one said pintle prior to engagement of said second gear with said first gear when said leading edge of said second gear rotates adjacent said first gear, whereby said teeth of said first and second gears smoothly engage.

7. A transmission as in claim 1 wherein said restricting means comprises a first clutch interposed between said mounting means and said output shaft, said first clutch permitting rotation of said output shaft in said predetermined direction.

8. A transmission as in claim 1 wherein said torque converter further comprises a means for storing rotational energy, such that when said mounting means rotates in the direction that creates rotation of said output shaft opposed to said predetermined direction of rotation, a portion of said rotational energy is stored.

9. A transmission as in claim 8 wherein said means for storing rotational energy comprises;
   a second clutch connected to said mounting means adjacent said frame wherein said second clutch permits free rotation of said mounting means in the direction that creates rotation of said output shaft in said predetermined direction;
   said second clutch further comprising an exterior collar, said collar being rotatable a portion of one revolution in both directions;
   a biasing means mounted to said frame adjacent said collar;
   an arm attached to and extending from said collar such that said arm engages and compresses said biasing means when said mounting means rotates opposite to said direction of free rotation of said mounting means, engages said collar and rotates said collar in the same direction, whereby when said mounting means ceases to rotate in said direction opposite to said free rotation, said biasing means urges said mounting means to rotate in said direction of free rotation.

10. A transmission as in claim 9 wherein said biasing means comprises a spring.

11. A continuously variable transmission comprising:
   an input drive shaft having a first end and a second end;
   a means for rotating said input drive shaft connected to said first end of said input drive shaft;
   a frame;
   three torque converters connected to said frame, each said torque converter comprising,
      a rotor;
      a mounting means rotatably connected to said frame for mounting said rotor for rotation about three axes, comprising a spin axis, an input precession axis and an output precession axis, such that said spin axis is generally perpendicular to said input precession axis and said input precession axis is generally perpendicular to said output precession axis;
      a means for rotating said rotor about said spin axis;
      gearing rotatably connected to said second end of said input drive shaft and rotatably attached to said mounting means, said gearing providing transmission of rotation from said input drive shaft to said rotor such that said rotor rotates about said input precession axis;
   an output shaft connected to each said mounting means of each said torque converter; and
   a restricting means for converting the resulting alternating rotation of at least a portion of said mounting means and said rotor of each said torque converter about the output precession axis into a continuous unidirectional rotation of said output shaft, said restricting means being mounted to said frame and interposed between said mounting means and said output shaft, whereby said output shaft will rotate in a predetermined direction.

12. A transmission as in claim 11 wherein each said rotor continuously rotates from 0 degrees through 360 degrees about said input precession axis of a respective said torque converter, said 0 degree position of each said rotor about said precession axis in relation to said transmission being the same, each said rotor being disposed and maintained at generally equal intervals about said 360 degrees of rotation about each respective said input precession axis.

13. A transmission as in claim 11 wherein each said mounting means comprises:
   a support member connected to said frame;
   a double wishbone support having two ends, each end comprising a shaft nub, each nub being rotatably attached to said support member such that the axis of said wishbone support is coincident to said input precession axis;
   a rotor spin axle mounted to said double wishbone support such that said spin axis lies in the same plane as said output precession axis, said rotor being mounted on said spin axle; and
   wherein said gearing comprises a first gear attached normal to said second end of said input drive shaft and a second gear attached to said double wishbone support such that the axis of said second gear is coincident with said input precession axis, said second gear being a half gear intermittently engaging said first gear, whereby as said half gear rotates, said rotation of said input drive shaft is intermittently transmitted to said rotor causing said rotor to rotate about said input precession axis.

14. A transmission as in claim 13 wherein said first and second gears each have teeth, a back side generally opposing said teeth and a peripheral edge, said first gear further comprising a plurality of pintles extending outwardly from said back side adjacent said peripheral edge of said first gear, said second gear further comprising a leading edge and a curved member attached to said peripheral edge of said second gear, said member having a concave portion, said member being aligned and configured such that said concave portion of said member captures one said pintle prior to engagement of said second gear with said first gear when said leading edge of said second gear rotates adjacent said first gear, whereby said teeth of said first and second gears smoothly engage.

15. A transmission as in claim 11 wherein each said restricting means comprises a first clutch interposed between said mounting means and said output shaft, said first clutch permitting rotation of said output shaft in said predetermined direction.

16. A transmission as in claim 11 wherein each said torque converter further comprises a means for storing rotational energy, such that when said mounting means rotates in the direction that creates rotation of said output shaft opposed to said predetermined direction of rotation, a portion of said rotational energy is stored.

17. A transmission as in claim 16 wherein each said means for storing rotational energy comprises;
   a second clutch connected to said mounting means adjacent said frame wherein said second clutch permits free rotation of said mounting means in the direction that creates rotation of said output shaft in said predetermined direction;

said second clutch further comprising an exterior collar, said collar being rotatable a portion of one revolution in both directions;

a biasing means mounted to said frame adjacent said collar;

an arm attached to and extending from said collar such that said arm engages and compresses said biasing means when said mounting means rotates opposite to said direction of free rotation of said mounting means, engages said collar and rotates said collar in the same direction, whereby when said mounting means ceases to rotate in said direction opposite to said free rotation, said biasing means urges said mounting means to rotate in said direction of free rotation.

18. A transmission as in claim 17 wherein said biasing means comprises a spring.

* * * * *